358-86. XR 3,050,712 SR CROSS REFERENCE SEARCH ROOM

Aug. 21, 1962 G. BRUCK 3,050,712

WIRED PROGRAM DISTRIBUTION SYSTEM

Filed Feb. 13, 1959 2 Sheets-Sheet 1

INVENTOR.
GEORGE BRUCK.

BY Alden D. Redfield
Charles M. Hogan
ATTORNEYS.

INVENTOR.
GEORGE BRUCK,
BY Alden D. Redfield
Charles M. Hogan
ATTORNEYS.

United States Patent Office 3,050,712
Patented Aug. 21, 1962

3,050,712
WIRED PROGRAM DISTRIBUTION SYSTEM

George Bruck, Cincinnati, Ohio, assignor to Avco Corporation, a corporation of Delaware Filed Feb. 13, 1959, Ser. No. 793,209
3 Claims. (Cl. 340—150)

The present invention relates to wired distribution systems for subscription television, popularly referred to as "pay TV." The principal object of the invention is to provide a wired television system characterized by efficient utilization of the coaxial cable program distribution system itself for first transmitting metering signals, indicative of usage, from the subscribers to substations, and then transmitting record data of such usage from the substations back to the central station, the latter mode of operation occurring during program shut-down periods. The system is an improved form of the generic type disclosed and claimed in the copending United States patent application of George Bruck and Paul F. G. Holst, entitled, "Service Distribution and Metering System," Serial No. 793,208, filed contemporaneously herewith and assigned to the same assignee as the present application and invention.

A further object of the present invention is to provide an improved method for transcribing serially recorded metering data into parallel billing information pertinent to the individual subscribers on the system. For a better understanding of the present invention, together with other and further objects, advantages, and capabilities thereof, reference is made to the following description of the accompanying drawings, in which.

Figure 1:
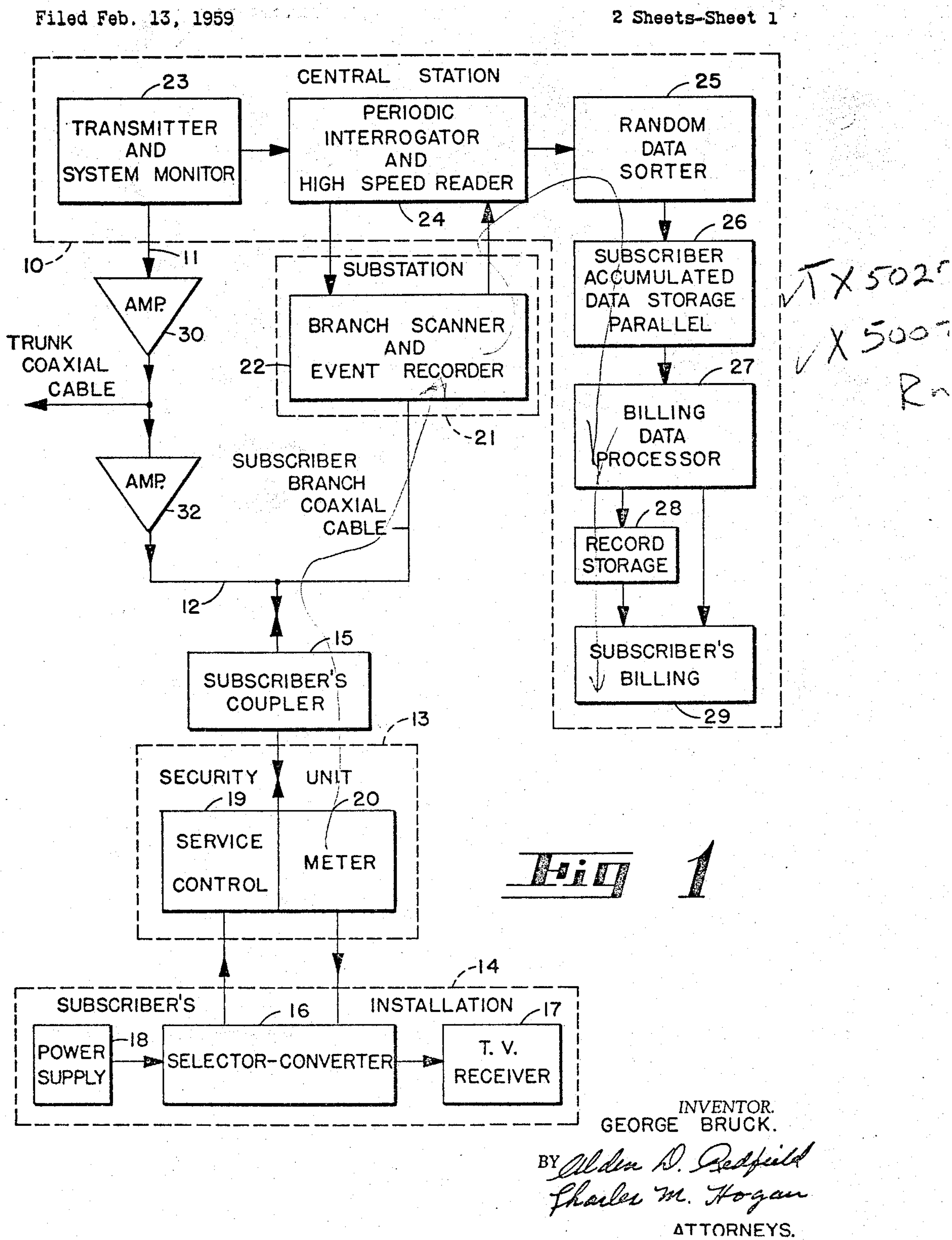
FIG. 1 is a block diagram of a generic type of pay television system optionally including improvements in accordance with the present invention, shown in block diagram form.

The FIG. 1 service distribution system is a closed circuit transmission system for programmed pay television service. It comprises a central station 10, which originates program transmissions and processes billing information; a primary program or service distribution network comprising a plurality of coaxial trunk cables (a representative one of which is illustrated at 11) coupled to the central station transmitter; a plurality of coaxial branch cables (a representative one of which is illustrated at 12), these branch cables constituting the secondary program distribution system; and a plurality of subscriber station equipments, a representative one of which is illustrated by a security unit 13 and a subscriber home installation 14. Many subscriber equipments are coupled to each branch line, from one to eight subscribers being coupled to each branch coaxial cable as by a coupler 15.

Each home installation comprises a selector-converter 16, which consists of a selector operable by the subscriber to select the desired program and a converter for converting the modulated carrier signals in the channel pertinent to such program into signals suitable for application to the input of a home television receiver 17. The home installation further includes a power supply 18. The security unit comprises service control means 19, controlled by the selector for switching the desired program to the associated subscriber home installation 14, together with meter means interlocked with the selector for generating metering signals which identify the subscriber and the program being received. These metering signals are transmitted from meter 20 via a subscriber coupler 15 to the coaxial branch cable 12 and to a substation 21. The substation includes suitable scanning and recording equipment 22 for reading and recording the metering signals from a plurality of subscriber equipments—that is to say, from all of the subscriber equipments coupled to a given subscriber branch coaxial cable, as described in the above-mentioned copending Bruck-Holst patent application, to which reference is accordingly made.

Parenthetically, the subscriber coupler 15 is preferably in the advanced form shown in the copending United States patent application of Emmery J. H. Bussard, entitled, "Coupler for Transmission Line," Serial No. 771,542, filed in the United States Patent Office on November 3, 1958, and assigned to the same assignee as the present invention and application (now U.S. Patent 2,963,665, issued December 6, 1960). Reference is made to such Bussard patent for a detailed description of a suitable subscriber coupler.

The central station equipment comprises the following principal units: a transmitter and system monitor 23; a periodic interrogator and high speed reader 24 for serially reading and recording all substation metering data; a random data sorter 25; a parallel data storage accumulator 26; a billing data processor 27; and suitable record storage and subscriber billing equipments 28 and 29.

The invention contemplates that a metropolitan area will be networked by a grid of coaxial transmission lines carrying a plurality (for example, three) of radio frequency channels with standard monochrome or color television signal modulations, such channels being hereinafter referred to as channels A, B, and C. Suitable illustrative frequencies are:

| Channel | Band, mc. | Sound, mc. | Picture, mc. |
|---|---|---|---|
| C | 16–22 | 16.25 | 20.75 |
| A | 26–32 | 26.25 | 30.75 |
| B | 34–40 | 34.25 | 38.75 |

These channels are therefore preferably located, carrier frequency-wise, in a region of the spectrum below the standard television broadcast bands, and the signal transmission will originate in unit 23. The grid of transmission lines comprises the primary system of cables 11, the secondary system of cables 12, and the tertiary or service system constituted by the couplings to the subscriber equipments. Suitable amplifiers 30 and 32 are inserted in the distribution system as required.

In one exemplary system, channels A and B constitute pay service, while channel C furnishes program previews, announcements of interest to the subscriber, and sustaining programs such as high fidelity music, all at no cost to the subscriber.

The primary trunk grid network terminates in the branch lines (such as 12), which through couplers (such as 15) provide services to groups of up to 250 subscribers per branch line. Service may be supplied to from four to eight customers through each coupler 15, and a large plurality of couplers will therefore be inserted in each branch cable 12. All subscribers coupled to a given branch cable constitute a group. The meter 20 of each individual subscriber in a group generates carrier signals for metering purposes in the radio frequency spectrum—from 3 to 5 megacycles, for example—and the signal output of the meters is, as described, modulated in terms of binary codes which identify the subscriber, the channel to which he is tuned, and the duration of his usage, all as shown in the above-mentioned copending Bruck-Holst patent application, to which reference is accordingly made. This frequency range of 3 to 5 megacycles is hereinafter referred to as the subscriber code transmission band.

Programs in all of the three channels are simultaneously available in the primary and secondary distribution systems. The programs on channels A and B may be graded to carry different billing rates. All channels are metered in accordance with time usage and the grade of the program delivered.

In practice, the subscriber manipulates a tuning dial in the selector-converter unit 16 to select the desired channel A, B, or C. Interlocked with the selector are the two principal functional arrangements in the security unit. One of these, 20, furnishes metering signals indicative of the subscriber's choice of program and identity. The other arrangement, 19, releases the program to the subscriber home installation 14.

Figure 3:
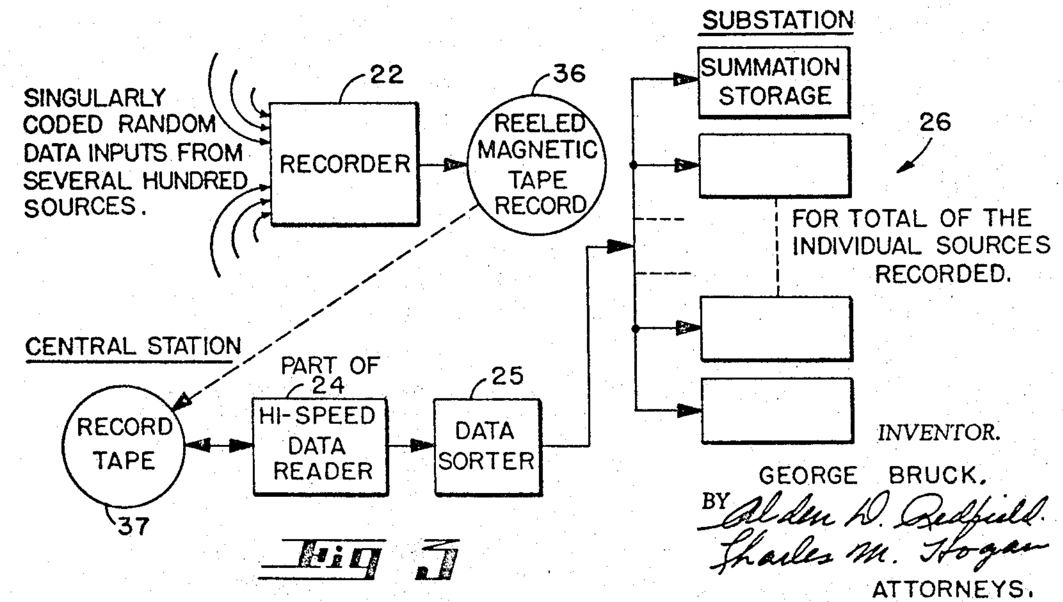
FIG. 3 is a functional block diagram showing the relationships between the recording equipment at each substation and the data processing equipment at the central station, all in accordance with the invention.

The service control unit 19 and the meter 20 so operate that when the particular channel is selected and the program in it delivered, metering signals identifying that channel are transmitted. The scanner device 22 at the substation periodically "looks at" each security unit transmitter and "notes" the usage or lack of usage there indicated. Information received by the branch scanner 22 is there recorded on drum, grid, or tape. That is to say, the metering information is transmitted via the branch cable 12 to the substation 21, at which it is recorded on tape 36, for example (FIG. 3). There are also recorded on such tape the substation "call letters" and information transmitted to substation 21 by transmitter 23 to indicate the program numbers and grades and time of transmission, as described in the above-mentioned copending Bruck-Holst patent application. Metering signals from the subscribers' equipment are random-recorded by means of a frequency scanning device 22 operating in a frequency range inclusive of the discrete frequencies of the subscribers' meters, but outside of the frequency range of the program channels. The permanent tape record of usage information 36 is made up at each substation over a prescribed period, for example, two weeks, and then transmitted to the central processing station in serial form.

In addition to the program transmitter, the central station also includes transmitting equipment for announcing programs. Prior to the start of each transmission, this equipment transmits and distributes on channel C announcements of program number and grade and time and duration of the program. This information as well as information relative to program interruptions is recorded at each substation 21. In the program start and stop signal-generating means at the transmitter, the code signal is modulated onto the output of an oscillator, having a frequency of 25 kilocycles, for example, and the output of that oscillator is placed on the sound carrier of channel C as frequency modulation.

The generic structure and operation of the over-all system so far described are illustrated and described in detail in the above-referred to copending patent application of George Bruck and Paul F. G. Holst, to which reference is made.

The Bruck-Holst system contemplates the manual transporting of storage tapes 36 (FIG. 3) from the several substations to the central station. By contrast, the present invention provides an improvement in which the data serially recorded on tape at the substations are sent back through the distribution cables 12 and 11 to the central station, re-recorded in serial form, and then converted to parallel form.

The FIG. 2 improvement in accordance with the invention operates generally in the same manner as the FIG. 1 system, except in the respects hereinafter specifically pointed out.

Again, the program is sent out from the transmitter unit 23 through the trunk cables 11 and branch cables 12 to the several subscriber security units 13 and ultimately the home installations. Also, metering signals identifying the subscribers and indicating service usage are sent back from the security units 13 through subscriber branch lines 12 to the substation interrogator and metered data recorder 22, corresponding to the unit entitled "Branch Scanner and Event Recorder" in FIG. 1. There the usages of the several subscribers are recorded in serial form and placed on tape 36 (FIG. 3).

Figure 2:
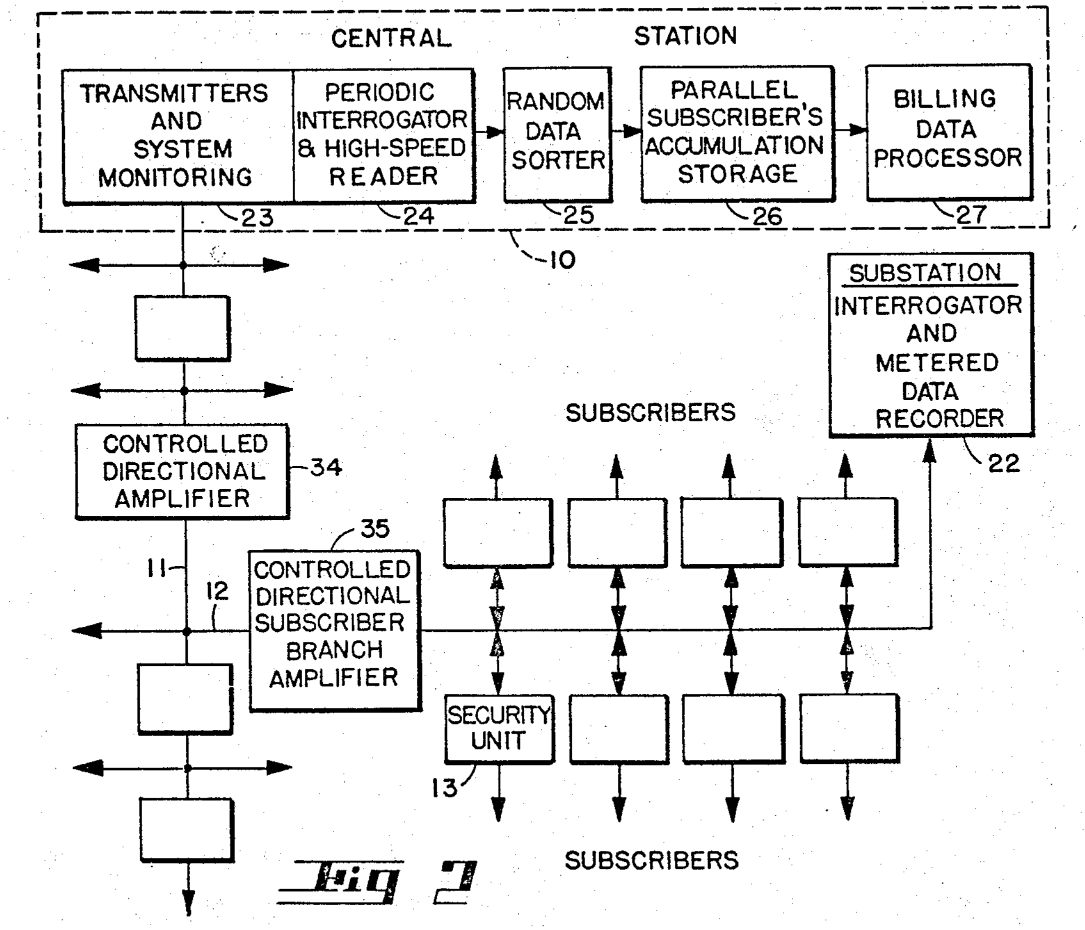
FIG. 2 is a system block diagram form of the improved system in accordance with the invention.

A principal feature of the FIG. 2 system, specifically in accordance with the invention, resides in the controlled directional amplifiers 34 and 35, which are inserted into the distribution system in such a manner that when program transmission is under way—that is, during the daily program period—these directional amplifiers, responsive to commands from the central station 10, permit the flow of program material outwardly toward the subscribers and the substations, usage data being recorded at the substations in the same manner as in the FIG. 1 system. Amplifier 34 is in series between central station 10 and the junction point of branch line 12 and trunk line 11, as shown in FIG. 3. Amplifier 35 is there shown as in series between that junction point (which is one of several) and the taps or couplers for the group of subscribers.

On the other hand, after the conclusion of the daily program period, then the interrogating equipment 24 interrogates the substations via the distribution system and re-records serially the usage data from all of the substations, the substations being interrogated successively by unit 24 is a manner similar to that in which the substation equipment 22 interrogates the several subscriber metering equipments. Each substation recording equipment 22 accordingly includes electrical signaling means (not shown in detail but included in the block 22) for reading out the substation record in the form of electrical signals. The result of such interrogation is that there is made up at the central station a record tape of usage data relating to all of the substations and subscribers, this tape being designated 37 in FIG. 3. During this operation the controlled directional amplifiers 34 and 35, responsive to reverse-operation commands from the central station 10, permit the passage of the usage data signals from the substations back to the central station.

It will be understood that the amplifiers are of a band-pass type designed for bi-directional service.

At the central station 10 the tape 37 is read out, via a high speed data reader included in unit 24, to a data sorter 25 which separates the serially recorded data into parallel information, according to each user and without redundance. This information is stored in unit 26 in a memory core system or equivalent, each user being assigned a separate location in the memory device.

In summary, the central station equipment "senses" each user and assigns his metered data accumulatively into a single port in storage unit 26, for later interrogation by suitable billing data processor equipment 27.

Thus it will be seen that the invention provides:

In a programmed electrical service distribution system, the combination of:

A central station (10) and a distribution system having trunk lines (11) and branch lines (12) for furnishing service, A plurality of subscriber equipments (13, 14) coupled to said distribution system, each subscriber equipment including signaling means (20) for transmitting metering signals identifying the subscriber and indicating his usage, A substation having sequential interrogating and recording means (22) for transcribing metering signals from all subscribers coupled to a branch line onto a substation record (36) of series data, Means at each substation for reading out the substation record in the form of electrical signals, Bilateral amplifiers (34, 35) inserted into the distribution system and operable in one direction in response to a central station command to pass the program through the lines to the subscribers and in the other direction to pass signals from the substation back to the central station, means (24) at the central station for sequentially interrogating the recorders at the substations and transcribing signals from all of them onto a central station tape record (37) of series data, and means (25, 26) for converting and storing said data in parallel form, according to subscribers.

The principal feature of the FIG. 2 system resides in the use of the distribution system itself to transmit to the central station all of the metering data recorded at the various substations. During the daily program period amplifiers 34 and 35 permit the flow of program material outwardly toward the subscriber and the substations, each substation 22 recording the metering signals and the usage in the same manner as the substation 21 of FIG. 1. That is to say, the pass band of the amplifier units 34 and 35, going outwardly, comprises that part of the spectrum inclusive of channels A, B, and C designated above.

After the conclusion of the program period, the interrogating equipment, included in the block designated 24, interrogates the substations via the distribution system and records serially the usage data from all of the substations. The interrogation is performed by suitable coding signals modulated onto a 24 megacycle carrier, for example, such carrier being within the pass band of the amplifier units 34 and 35 for signals going outwardly. During this phase of operation, the controlled directional amplifiers permit the passage of metering signal data from the substations back to the central station. The substations may be "read out" at 44 megacycles, for example. That is to say, the data already recorded at the several substations 22 are, in response to the interrogation mentioned above, transmitted via the distribution system back to the central station, where the data are re-recorded and processed for billing. Accordingly, the pass band of the amplifier units 34 and 35, for signals passing in the direction from the substations toward the central station, is out of the portion of the spectrum embracing channels A, B, and C, and preferably is at a higher frequency such as 44 megacycles mentioned above.

It will be clear from the foregoing description that the recording equipment at the substation records signals within the subscriber band of 3 to 5 megacycles and responds to coded signals on the 24 megacycle carrier to transmit the recorded data back to the central station.

It will be understood that with this system it is practical to record metering signal data at the substations during a program period of, say, thirty minutes, and then transmit all such data back to the central station within a very short period between programs—of, say, a minute or less.

While there has been shown and described what is at present considered to be the preferred embodiment of the invention, it will be understood by those skilled in the art that various modifications and changes may be made therein without departing from the proper scope of the invention as described in the appended claims.

I claim:

1. In a programmed electrical service distribution system for pay-television, the combination of:

a central station and a distribution system having coaxial-cable trunk lines and coaxial-cable branch lines for furnishing services at video frequencies, each of said trunk lines being connected to said central station and providing a series of junctions along its length and each of said branch lines being connected to one of said junctions and similarly providing a series of subscriber taps along its length;

a plurality of groups of subscriber equipments, one for each branch line, each subscriber equipment being connected to a subscriber tap and including signaling means for continuously transmitting metering signals of radio frequencies identifying the subscriber and indicating his usage;

a substation connected to each branch line, each substation having scanner-type interrogating and recording means coupled to its associated branch line for transcribing metering signals from all subscribers connected to said associated branch line onto a substation tape record in the form of electrical signals;

bilateral amplifiers inserted in series into those portions of the trunk lines which are between junctions;

other bilateral amplifiers inserted in series into those portions of the branch lines between their respective junctions with trunk lines and the subscriber taps;

all of said bilateral amplifiers being command-controlled by the central station so that the bilateral amplifiers are operable in one direction to pass the program from the central station to the subscribers and in the other direction to pass signals from the substations back to said central station;

and means coupled to the trunk lines and located at the central station for sequentially interrogating the recording means at the substations and transcribing signals from all of the recording means onto a central station tape record.

2. In a programmed electrical service distribution system for pay-television, the combination in accordance with claim 1 and means located at the central station for converting and storing said data in parallel form according to subscribers.

3. In a programmed electrical service distribution system for pay-television, the combination of:

a central station and a distribution system having coaxial-cable trunk lines and coaxial-cable branch lines for furnishing services at video frequencies, each of said trunk lines being connected to said central station and providing a series of junctions along its length and each of said branch lines being connected to one of said junctions and similarly providing a series of subscriber taps along its length;

a plurality of groups of subscriber equipments, one for each branch line, each subscriber equipment being connected to a subscriber tap and including signaling means for continuously transmitting metering signals identifying the subscriber and indicating his usage;

a substation connected to each branch line, each substation having scanner-type interrogating and recording means coupled to its associated branch line for transcribing metering signals from all subscribers connected to said associated branch line onto a substation tape record in the form of electrical signals;

bilateral amplifiers inserted in series into those portions of the trunk lines which are between junctions;

other bilateral amplifiers inserted in series into those portions of the branch lines between their respective junction with trunk lines and the subscriber taps;

all of said bilateral amplifiers being command-controlled by the central station so that the bilateral amplifiers are operable in one direction to pass the program from the central station to the subscribers and in the other direction to pass signals from the substations back to said central station;

and means coupled to thet runk lines and located at the central station for sequentially interrogating the recording means at the substations and transcribing signals from all of the recording means onto a central station tape record.

References Cited in the file of this patent

UNITED STATES PATENTS

| | | |
|---|---|---|
| 2,484,734 | Rahmel | Oct. 11, 1949 |
| 2,668,875 | Shepherd | Feb. 9, 1954 |
| 2,757,226 | Zworykin | July 31, 1956 |
| 2,870,258 | Cooper | Jan. 20, 1959 |
| 2,886,643 | Harris | May 12, 1959 |